Patented Dec. 3, 1940

2,223,548

UNITED STATES PATENT OFFICE 2,223,548

POLYMERIZATION WITH AN ALKYL PHOSPHATE POLYMERIZING AGENT

Solomon Caplan, New York, N. Y.

No Drawing. Application October 2, 1937,
Serial No. 167,072

7 Claims. (Cl. 260—46)

The present invention relates to a method of polymerizing unsaturated hydrocarbon compounds in which organic phosphates are used as the polymerization reagents.

I have found that alkyl phosphates and other hydrocarbon phosphates can be used in place of concentrated sulphuric acid, aluminum chloride, zinc chloride and so on, heretofore used, without the well known disadvantages attendant on the use of such reagents. The use of organic phosphates for polymerizing gives a good polymerizing reaction but in other respects the organic phosphates are milder to a great degree and local polymerization and "burning" do not occur and it is easy to obtain uniform polymerization and easy to control the degree of polymerization. The organic phosphates suitable for the practice of the present invention can be classified generally as hydrocarbon phosphates other than those in which an aromatic nucleus is attached to a phosphate radicle. To eliminate aromatic phosphates, the organic phosphates suitable for the practice of the present invention are classified as saturated hydrocarbon phosphates.

Examples of organic phosphates suitable for use in the present invention are tributyl phosphate, dibutyl acid phosphate, tripropyl phosphate, dipropyl acid phosphate, triethyl phosphate, diethyl acid phosphate, triamyl phosphate and diamyl acid phosphate, the tri-benzyl and the tri-cyclohexyl phosphates and the di-benzyl acid and di-cyclohexyl acid phosphates.

Examples of unsaturated hydrocarbon materials which can be polymerized by the method of the present invention are: the unsaturated compounds in gas house drip and coal tar such as solvent naphtha, coumarone, indene, styrene, and so on; Pine oil, limonene; citronella grass oil, lemon grass oil, vetiver grass root oil and the various and several unsaturated alcohol and aldehyde constituents of these oils such as geraniol, geranial, citronellal and citronellol; unsaturated fatty acid oils such as China-wood oil; unsaturated fatty acids such as linoleic acid, linolic acid, and so on and the mono- and poly-glycerides of unsaturated fatty acids such as those found naturally in drying, semi-drying and non drying oils, for example, the mono and poly glycerides of linolic acid, linoleic acid and so on, whether taken from the natural product or made artificially; cashew nut shell liquid and its phenolic constituents and phenolic derivatives such as cardol, anacardic acid, "cardanol" and other phenolic distillates, and also distillate residues having unsaturated side chains; marking nut shell liquid and its phenolic constituents anacardol and the carboxylic phenols, its phenolic distillates and phenolic distillate residues having unsaturated side chains; Japanese lac and its phenolic constituents including urushiol; and in general those unsaturated organic compounds which can be polymerized with concentrated or fuming sulphuric acid with the aid of heat. It is here noted that the examples given which are phenols having an ortho or the para position unsubstituted can be reacted with an aldehyde, such for example as formaldehyde, either before, during or after the polymerization by the methods of the present invention.

Examples of particular materials and methods used in the practice of the present invention are as follows:

*Example I.*—In one hundred parts by weight of China-wood oil, ten parts of diethyl phosphate were dissolved and the solution heated overnight at 500° F. The product was a rubbery mass suitable for milling into rubber, or for making varnishes with driers and so on by methods commonly used for making varnishes, and for other purposes.

*Example II.*—Into one hundred parts by weight of styrene are dissolved five parts of diethyl phosphate and the solution heated in a closed container for three hours at 550° F. and then for three hours at 500° F. A hard brittle resin is formed which is suitable for use in lacquers, varnishes and in molded compositions.

*Example III.*—Into one hundred parts by weight of a fraction of gas house drip oil boiling between 150° C. and 200° C. and containing indene and styrene were dissolved five parts of diethyl phosphate and the solution heated in a closed container for three hours at 550° F. and then for three hours at 500° F., a hard brittle resin being obtained which is suitable for use in lacquers, varnishes, molded compositions, and for other uses to which cumar resin is used.

*Example IV.*—To a quantity of cashew nut shell liquid about five per cent of its weight of tributyl phosphate is intermixed and the mixture heated to about 300° F. for about sixteen hours and the product is of a rubbery consistency.

Another trialkyl phosphate such as triethyl phosphate can be used instead of the tributyl phosphate of this Example IV and the amount can be from 5% to 10% of the weight of cashew nut shell liquid used, and the polymerizing temperature can be at about 500° F.

*Example V.*—A condensation product is made by reacting equimolecular proportions of cashew nut shell liquid and pine oil with a mole of concentrated sulphuric acid added slowly while maintaining the mixture at a temperature below 25° C., as between 20° C. and 25° C. and the condensation product washed free of sulphuric acid with water and then dehydrated by heating to about 120° C. This cashew nut shell liquid-pine condensation is polymerized by heating to about 500° F. with about five per cent of its weight of tributyl phosphate and holding at that temperature for about one and one-half hours. The resulting polymerization product is a heavy-bodied liquid which is suitable for use in various ways, as for example, by condensing with an aldehyde such as formaldehyde, paraformaldehyde, hexamethylene tetramine, furfural and so on, without catalyst or with a catalyst such as acid or alkaline, hydrochloric acid, sodium hydroxide, ammonia.

*General example.*—The method of the present invention comprises heating the condensation product of about equal molecular proportions of cashew nut shell liquid and pine oil with from 5% to 10% of the weight of said condensation product in tributyl phosphate at about 500° F., until a predetermined degree of polymerization is reached.

The products of the method of the present invention are polymers of the materials used for producing them, that is, the products of the methods of the present invention have higher molecular weights and higher softening points than those of the materials used for producing them. In some cases the polymerization has been carried on to a point where softening of the product under heat does not take place before carbonization would occur.

With the methods of the present invention uniform polymerization throughout the mass being treated can be obtained more easily than with the use of concentrated or fuming sulphuric acid and local burning or charring does not occur and there is also the advantage that sulphur dioxide is not produced. The polymerization takes place fully but quietly and uniformly and without foaming and with a strength that is mild in its action and the polymerization can be controlled or stopped at a desired point to get a predetermined degree of thickening. For all degrees of polymerization the products obtained are light colored and very much lighter colored than the products obtained by the use of polymerizing agents heretofore generally used.

The particular examples of the methods of the present invention and of examples of the application of the methods of the present invention are given as illustrations toward the adding and teaching of the methods of the present invention to the art and are not for the limitation of the claims hereof.

The heating temperatures given in the examples above for the polymerization step are not limiting as various temperatures are suitable for various compounds to be polymerized and for the various organic phosphates used but the polymerization temperatures can be stated generally as being between 400° F. and 600° F., many of them being between about 450° F. and 560° F.

Having thus described my invention, what I claim and desire to protect by Letters Patent is:

1. The method which comprises heating the condensation product of about equal molecular proportions of cashew nut shell liquid and pine oil with from 5% to 10% of the weight of said condensation product in tributyl phosphate at about 500° F., until a predetermined degree of polymerization is reached.

2. The method of polymerizing cashew nut shell liquid which comprises heating cashew nut shell liquid with from about 5% to about 10% of its weight of triethyl phosphate, at about 500° F.

3. The method which comprises condensing an aldehyde with the polymerization product of claim 6.

4. The method which comprises condensing cashew nut shell liquid and pine oil with the aid of a condensing agent and heat and polymerizing the condensation product with the aid of a polymerizing agent comprising a trialkyl phosphate and heat.

5. The method which comprises condensing cashew nut shell liquid and pine oil with the aid of a condensing agent, polymerizing the condensation product with the aid of a polymerizing agent comprising a trialkyl phosphate and heat and condensing with an aldehyde.

6. The method of polymerizing a phenol derived from the flora family of Anacardiaceae, which phenol has an unsaturated hydrocarbon group on the aromatic nucleus thereof, which comprises heating with an alkyl phosphate.

7. The method which comprises heating a phenol having an unsaturated hydrocarbon group on the aromatic nucleus thereof in contact with an alkyl phosphate until polymerization takes place.

SOLOMON CAPLAN.